Figure 1:
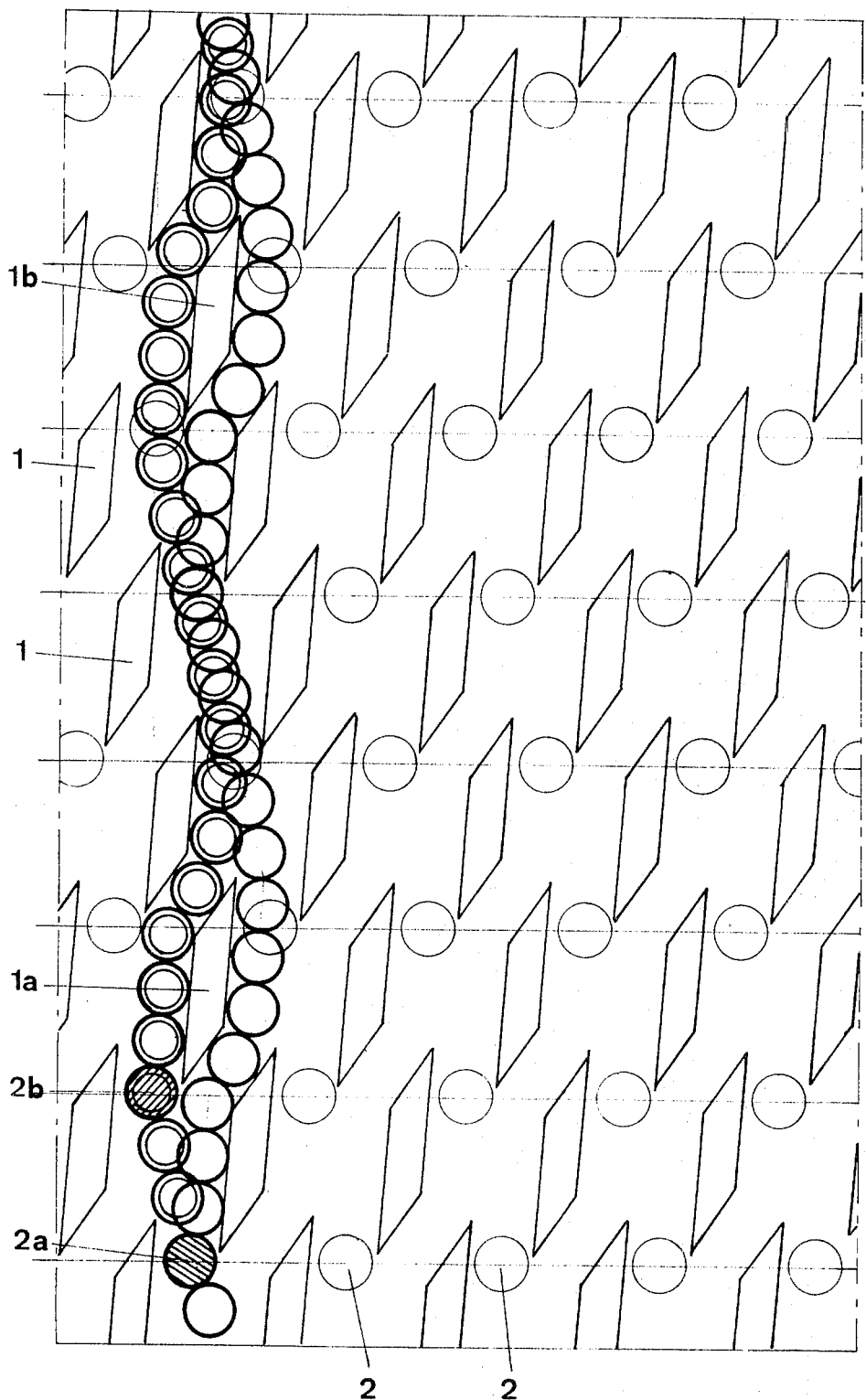

United States Patent [19]
Ronner

[11] 3,841,611

[45] Oct. 15, 1974

[54] MIXING AND KNEADING DEVICE

[75] Inventor: Fritz Ronner, Pratteln, Switzerland

[73] Assignee: Buss, A. G., Basel, Switzerland

[22] Filed: July 14, 1972

[21] Appl. No.: 271,931

[52] U.S. Cl. .................................. 259/102, 259/5
[51] Int. Cl. .............................................. B01f 7/02
[58] Field of Search ............ 259/5, 21, 40, 64, 102, 259/191, 192, 193, 194, 9, 10; 425/208, 209

[56] References Cited
UNITED STATES PATENTS

| | | | |
|---|---|---|---|
| 3,189,324 | 6/1965 | Gubler | 259/9 |
| 3,219,320 | 11/1965 | Sutter | 259/5 |
| 3,252,182 | 5/1966 | Colombo | 259/192 |
| 3,253,818 | 5/1966 | Seddon et al. | 259/9 |
| 3,346,242 | 10/1967 | List | 259/5 X |
| 3,618,903 | 11/1971 | Ronner et al. | 259/5 X |

Primary Examiner—Harvey C. Hornsby
Assistant Examiner—Philip R. Coe
Attorney, Agent, or Firm—Abraham A. Saffitz

[57] ABSTRACT

The present invention relates to a mixing and kneading device comprising a housing, a screw shaft arranged in said housing and being provided with mixing and kneading vanes, further comprising means for rotating and simultaneously reciprocating said screw shaft within said housing, the housing being provided with kneading elements or teeth arranged on the inner wall thereof and said kneading teeth projecting radially inwards. The invention relates also to a process for the operation of this mixing and kneading device.

1 Claim, 2 Drawing Figures

MIXING AND KNEADING DEVICE

In the mixing and kneading device of the present invention, the kneading teeth pass through the gaps existing between the worm vanes while the screw shaft rotates and oscillates in reciprocating manner. It is necessary to precisely coordinate the geometrical configuration of the worm vanes with the position of the kneading teeth, taking into consideration the motion of the screw, so that the kneading teeth pass by the worm vanes as closely as possible, in order to introduce high shearing forces into the product being mixed and to wipe off the material from these close surfaces. Up to now, three-vane screws have been built in the prior art, in which the helical worm moving around the shaft is interrupted three times in each full turn, and wherein three rows of kneading teeth are arranged on the inner wall of the housing for efficient mixing and wiping. In order to keep the clearance between the vanes and the kneading teeth as small as possible in these three vane machines, a very complicated worm-vane shape is required and thus time-consuming machining is necessary to make this shape, so that it is not possible to produce the worm vanes with straightforward machining operations.

To achieve the most favourable possible conditions in regard to the required shearing forces and wiping characteristics together with the requirement for simple machining of a worm vane that is easy to produce, it has been proposed in my prior U.S. Pat. application Ser. No. 254,091, filed May 17, 1972 that the helical worm moving around the shaft be interrupted at least four times per turn, resulting in a so-called four-vane screw which interacts with four rows of kneading elements. This construction of my prior application makes possible quite a good coordination of the relative path of movement between the vane and the kneading elements.

In order to create more efficient mixing conditions, however, the present invention now proposes a further modification of the device of my prior patent application described above. In place of the previously employed worm vanes, which in development are matched as closely as possible to the sinusoidal axial motion, a new, favourable and easy-to-machine vane shape is proposed which is suited to the axial motion of the shaft. Accordingly, the device of the type mentioned at the outset is characterized by the fact that the described four mixing and kneading vanes possess at least approximately plane interacting surfaces which are movable along the kneading elements, whereby the driving means provided for the axial motion of the shaft are controllable in relation to the shape of the mixing and kneading vanes.

The process for the operation of the device comprising a screw shaft arranged in a housing, capable of rotation and simultaneous reciprocation and provided with mixing and kneading vanes, and comprising kneading teeth arranged on the inner wall of the housing and projecting radially inwards, is characterized by the fact that the mixing and kneading vanes describe a motion in passing over the kneading elements which is determined by the shape of their interacting surfaces. This motion can involve a cam selected to suit the shape of the vane.

As an embodiment, a screw in development is shown on the accompanying drawing, which will be further explained in the following.

Figure 2:
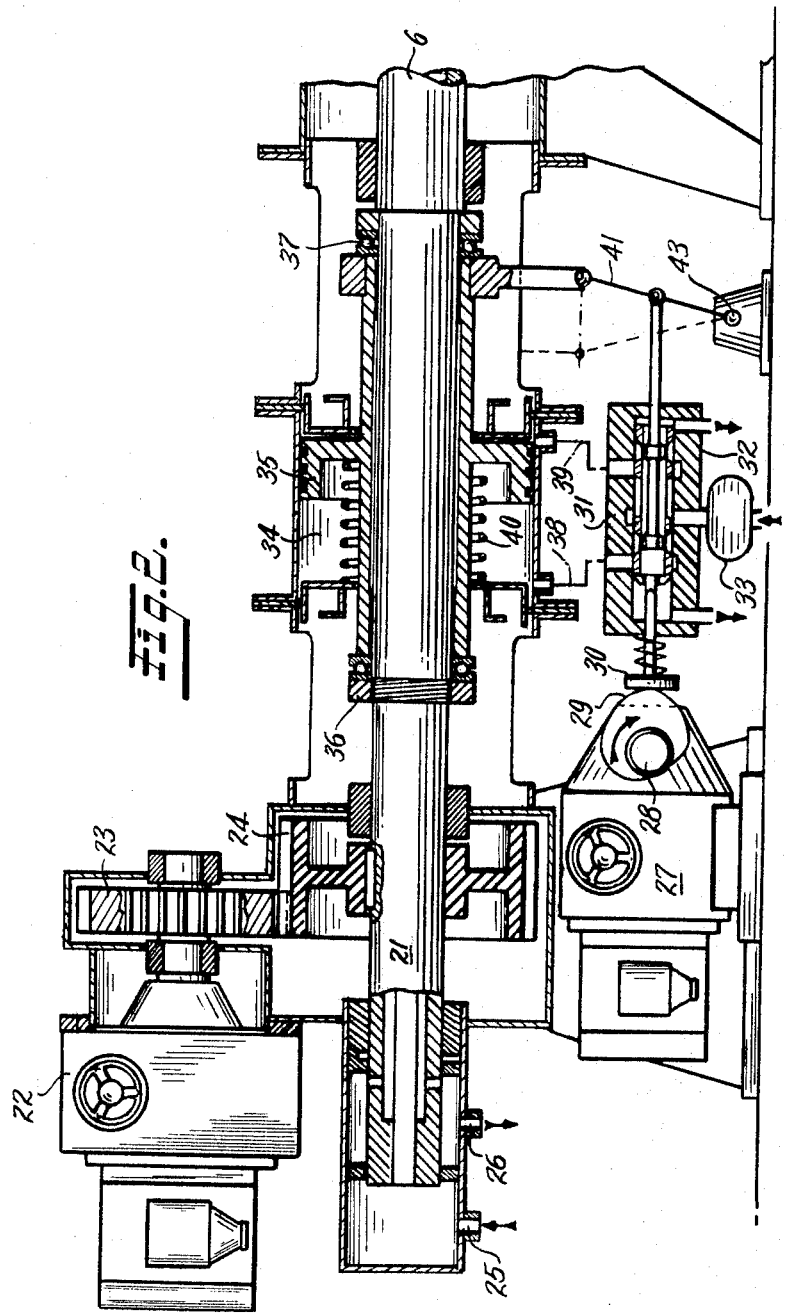

The drawing illustrates in FIG. 1 the development of a mixing and kneading device wherein the helical worm is interrupted eight times in each turn in order to form eight mixing and kneading vanes, which are designated by numeral 1 in the drawing and in FIG. 2 a vertical section illustrating the independent driving arrangements for the rotary movement and for the reciprocating movement of the device of FIG. 1. Interacting with these mixing and kneading vanes are eight rows of kneading elements 2, which can be arranged for example as pins set into the inner wall of the housing.

FIG. 2 schematically shows the combined drive for the shaft 6 which is connected to hollow driving shaft 21 in line therewith. The driving shaft 21 is guided in slide bearings and is driven through gear train 23, 24 by variable speed motor 22. The end of the hollow driving shaft 21 is provided with inlet 25 and outlet 26 for heating or cooling medium.

The reciprocating movement is provided by a separate drive which is powered by a variable speed motor 27. Keyed on the output shaft 28 of motor 27 is cam disc 29. The cam disc can be replaced to provide a different curve. The curve of the cam disc governs the rapidity of the forward stroke and the slowness of the backward stroke. Variations in these rates are achieved by substituting discs. The curved surface of the disc 29 guides the spring loaded heat 30 of hydraulic regulating valve 32. The regulating hydraulic valve 32 is a multiple-disc type fitted with cylinder 31, fed with fluid from pressure pump 33, and driven by pump motor 27 whose transmission is not shown. The hydraulic passageways in the regulating valve 32 lead to working cylinder 34 mounted coaxially with hollow driving shaft 21, with working piston 35 interposed therebetween. The piston 35 is clamped to the shaft 21 over ball bearings 37 in such manner that the driving shaft 21 rotates freely, but the piston does not rotate, the ball bearings resting against the face of the tightening nut 36 which is threaded onto the driving shaft 21.

Depending upon the position of disc 29, the hydraulic fluid flows under pressure either through line 38 or line 39 which pushes the piston either to the left or to the right. The movement in the forward direction to the right is assisted and the movement to the left is dampened by spring 40 mounted on nonturning piston 35.

The reciprocating movement to and at the turning point is controlled by a limit sensor having a bar transmission 41, the bar being pivoted on bearing point 43 and connected to the stem of sliding discs inside of the hollow stem of valve 32. These sliding discs provide a superimposed bypass for the hydraulic fluid within the valve 32 and serve to maintain the hydraulic pressure at a desired value once the end position has been reached and until the curve on cam disc 29 causes the stem 30 to reverse. The cam disc is curved to provide a holding position over 15° of arc at the periphery of the disc; and, in this 15° arc, the reciprocating push-pull motion is stopped. The hydraulic drive is assisted by the spring 40 which accumulates force during the backward stroke and expends this force to assist the forward stroke.

As can be seen clearly in the drawing, the vanes are formed as sections of a simple and easily produced worm spiral; their cross-sectional shape is that of a rhombus. No costly relief-milling of the vanes is necessary. Of course any other easily producible shape can be employed for the vanes.

The axial motion of the shaft, then, is controlled in such a way that the relative path of movement of the kneading elements 2 in relation to the vanes 1 follows the contour of the latter as precisely as possible. It is merely necessary to take into consideration the necessary design clearance between vane 1 and kneading element 2.

The drawing includes the illustration of an exemplary sequence of motion. For the sake of simplicity, the presentation has been made as if the kneading elements 2 would move past the stationary vanes 1, while in actual fact the opposite is the case. This makes no difference for the principle of the invention, however. The exemplary path of motion in the axial direction during one revolution comprises a number of straight lines, since the external surfaces of the vanes are plane. While the distance between two horizontal lines in the drawing corresponds to 45° of shaft rotation, a section of the path running perpendicular to these lines represents a cessation in the axial displacement of the shaft, movement of the path to the left corresponds to a forward stroke and movement to the right to a rearward stroke.

To make clear just how closely the vanes 1 pass over the kneading elements 2, the relative paths of a kneading element 2a and of one 2b are illustrated. As can be seen, only a small amount of clearance remains around the periphery of vanes 1a and 1b.

With such a zig-zag movement of the screw, the discharge of product can be influenced in simple fashion. Thus a slow and uniform discharge can be achieved by means of a shorter return stroke of the screw, or a short, intensive discharge can be achieved by means of a long return stroke. Moreover, the rearward transport provided by the screw can be adjusted from a large quantity to a small one as desired.

The well known pulsating product discharge which is typical of conventional screws (See, Ullmann, Enzyklopadie der technischen Chemie, seventh Edition 1931, page 619, lines 9 – 18) can be reduced or eliminated in the proposed solution of the invention in that discharge is effected during more than 180° of screw rotation, while the screw is withdrawn axially over less than 180° of rotation. Depending on the design, the axial motion can comprise up to three-fourths discharge and one-fourth return stroke.

The gear unit for the axial motion of the screw in the present invention includes a control means which acts as a function of the vane shape. The control means can comprise a cam chosen to suit the vane shape or, alternatively may comprise hydraulic means, having the design configuration in FIG. 3 of Swiss patent 497.195 this corresponding to U.S. Pat. No. 3,618,903 and in Swiss Pat. No. 504.227 of the applicant corresponding to U.S. Pat. Ser. No. 176,112, now allowed. A further hydraulic drive may be used, similar to that which was made known in Swiss Pat. No. 507.733, U.S. Pat. No. 3,618,903.

Finally the possibility is mentioned that, for a corresponding vane shape, the non-sinusoidal oscillating motion in combination with the rotation of the screw be created mechanically from the path of a point P, which is affixed to a circle of radius $r$ at a distance "$a$" from the center M of the circle, when this circle rolls along a straight line without slippage. In this case, the distance "$a$" can be chosen equal to, greater than or less than the radius $r$. Under certain conditions, a gear unit for generating such motions is less costly to produce than a comparable gear unit operating sinusoidally. Other types of gear units may also be of advantage, for instance the mechanically created path of a point P', when a circle $k$ with radius $r'$ rolls down the periphery of a stationary circle K with radius R. Depending on the distance $a'$ point P' from the center M of the circle $k$, different paths of motion are generated for $a' = r'$, $a'$ larger than $r'$, or $a'$ less than $r$. Other paths of motion can be generated with $r' = R$ or $3r' = R$, whereby the last-mentioned would already represent a special version of the aforementioned cam control system.

What I claim is:

1. A mixing and kneading device comprising:

a housing;

kneading teeth arranged on the inner wall of said housing and said teeth projecting radially inwardly;

a screw shaft having a helically arranged worm thread arranged in said housing, the helical arrangement forming mixing and kneading vanes, each vane being machined with plane interacting surfaces movable along the kneading teeth in close relationship and having a cross-section of rhombus so that relief milling for closely fitting the vanes to the kneading teeth is not necessary on said screw shaft;

means for rotating and simultaneously reciprocating said screw shaft within said housing;

said worm thread being interrupted at least four times in each turn of the shaft and the four mixing and kneading vanes thus formed being movable along said teeth;

control means for the movement of the screw shaft comprising a cam machined of rhombus form which is shaped to complement the vane shape and to provide a substantially plane interacting surface; and, driving means for rotating and reciprocation of the shaft.

* * * * *